United States Patent
Kato

(10) Patent No.: US 11,321,695 B2
(45) Date of Patent: May 3, 2022

(54) MONITORING DEVICE

(71) Applicant: TOSHIBA TEC KABUSHIKI KAISHA, Tokyo (JP)

(72) Inventor: Suguru Kato, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/175,712

(22) Filed: Feb. 15, 2021

(65) Prior Publication Data
US 2021/0398101 A1 Dec. 23, 2021

(30) Foreign Application Priority Data
Jun. 23, 2020 (JP) .............................. JP2020-107898

(51) Int. Cl.
*G06Q 20/20* (2012.01)
*G07G 1/00* (2006.01)

(52) U.S. Cl.
CPC ......... *G06Q 20/207* (2013.01); *G06Q 20/204* (2013.01); *G06Q 20/208* (2013.01); *G07G 1/0045* (2013.01)

(58) Field of Classification Search
CPC .. G06Q 20/207; G06Q 20/204; G06Q 20/208; G07G 1/0045
See application file for complete search history.

(56) References Cited

U.S. PATENT DOCUMENTS

| | | | | |
|---|---|---|---|---|
| 7,272,577 B1* | 9/2007 | LaMotta | ............... | G06Q 20/207 705/31 |
| 7,933,803 B1* | 4/2011 | Nadler | ................. | G06Q 20/207 705/19 |
| 2012/0030045 A1* | 2/2012 | Smith, III | ............ | G06Q 20/207 705/19 |
| 2012/0280040 A1 | 11/2012 | Carney et al. | | |

(Continued)

FOREIGN PATENT DOCUMENTS

EP    3483812 A1    5/2019

OTHER PUBLICATIONS

Cole, Gail. "The Rules on Sales Taxes for Food Takeout and Delivery". Retrieved from <https://www.cpapracticeadvisor.com/sales-tax-compliance/news/21134126/the-rules-on-sales-taxes-for-food-takeout-and-delivery> on Jul. 25, 2021. Originally published Apr. 2020. (Year: 2020).*

(Continued)

*Primary Examiner* — Nathan A Mitchell
(74) *Attorney, Agent, or Firm* — Kim & Stewart LLP

(57) ABSTRACT

A monitoring device includes an interface circuit connectable to first and second readers. The first reader reads data from a tag attached to a commodity discarded within a predetermined area. The second reader reads data from a tag attached to a commodity taken out from the predetermined area. A processor is configured to, upon receipt of first data from the first reader, determine whether a tax rate is applied to a commodity to which a tag having the first data is attached, and upon determining that the rate is applied, store (Continued)

an identifier of the tag. The processor is configured to, upon receipt of second data from the second reader, determine whether an identifier of a tag having the second data is stored, and upon determining that the identifier is stored, issue a signal to output an alarm.

20 Claims, 2 Drawing Sheets

(56) References Cited

U.S. PATENT DOCUMENTS

| | | | | |
|---|---|---|---|---|
| 2013/0275237 | A1* | 10/2013 | Ramaratnam | G06Q 30/0637 |
| | | | | 705/16 |
| 2015/0262159 | A1 | 9/2015 | Kakino et al. | |
| 2015/0356539 | A1* | 12/2015 | McNeel | G06Q 20/207 |
| | | | | 705/19 |
| 2018/0137494 | A1* | 5/2018 | Matsukura | G06Q 20/201 |
| 2018/0260877 | A1 | 9/2018 | Li et al. | |
| 2020/0342435 | A1* | 10/2020 | Yamazaki | G06Q 20/202 |

OTHER PUBLICATIONS

Newton, Chris. Retrieved from <https://web.archive.org/web/20120107034024/https://smallbusiness.chron.com/eatin-tax-17772.html> on Jul. 25, 2021. Originally published Jan. 2012. (Year: 2012).*

Extended European Search Report dated Oct. 20, 2021 in corresponding European Patent Application No. 21161737.8, 10 pages.

* cited by examiner

MONITORING DEVICE

CROSS-REFERENCE TO RELATED APPLICATIONS

This application is based upon and claims the benefit of priority from Japanese Patent Application No. 2020-107898, filed on Jun. 23, 2020, the entire contents of which are incorporated herein by reference.

FIELD

Embodiments described herein relate generally to a monitoring device, a monitoring method, and a monitoring system.

BACKGROUND

In a settlement of a commodity that can be consumed in a store or outside the store, either a standard tax rate or a reduced tax rate may be applied based on a declaration by a customer. In some jurisdictions, the reduced tax rate applies when a commodity is consumed outside the store. In such a case, there are cases where a false declaration may be made and the reduced tax rate would be wrongfully applied even when the commodity is actually consumed in a store. However, in general, no particularly effective measures exist to deal with such evasions or the like.

DETAILED DESCRIPTION

In general, according to an embodiment, a monitoring device includes a first interface circuit connectable to first and second readers. The first reader is configured to read tag data from a wireless tag attached to a commodity discarded within a predetermined area. The second reader is configured to read tag data from a wireless tag attached to a commodity being taken out from the predetermined area. The monitoring device further includes a processor configured to, upon receipt of first tag data from the first reader via the first interface circuit, determine whether a predetermined tax rate is applied to a commodity to which a wireless tag having the first tag data is attached when the commodity is checked out, and upon determining that the predetermined tax rate is applied when the commodity is checked out, store a tag identifier of the wireless tag in memory. The processor is further configured to, upon receipt of second tag data from the second reader via the second interface circuit, determine whether a tag identifier of a wireless tag having the second tag data is stored in memory, and upon determining that the tag identifier is stored in memory, issue a signal to output an alarm.

Figure 1:
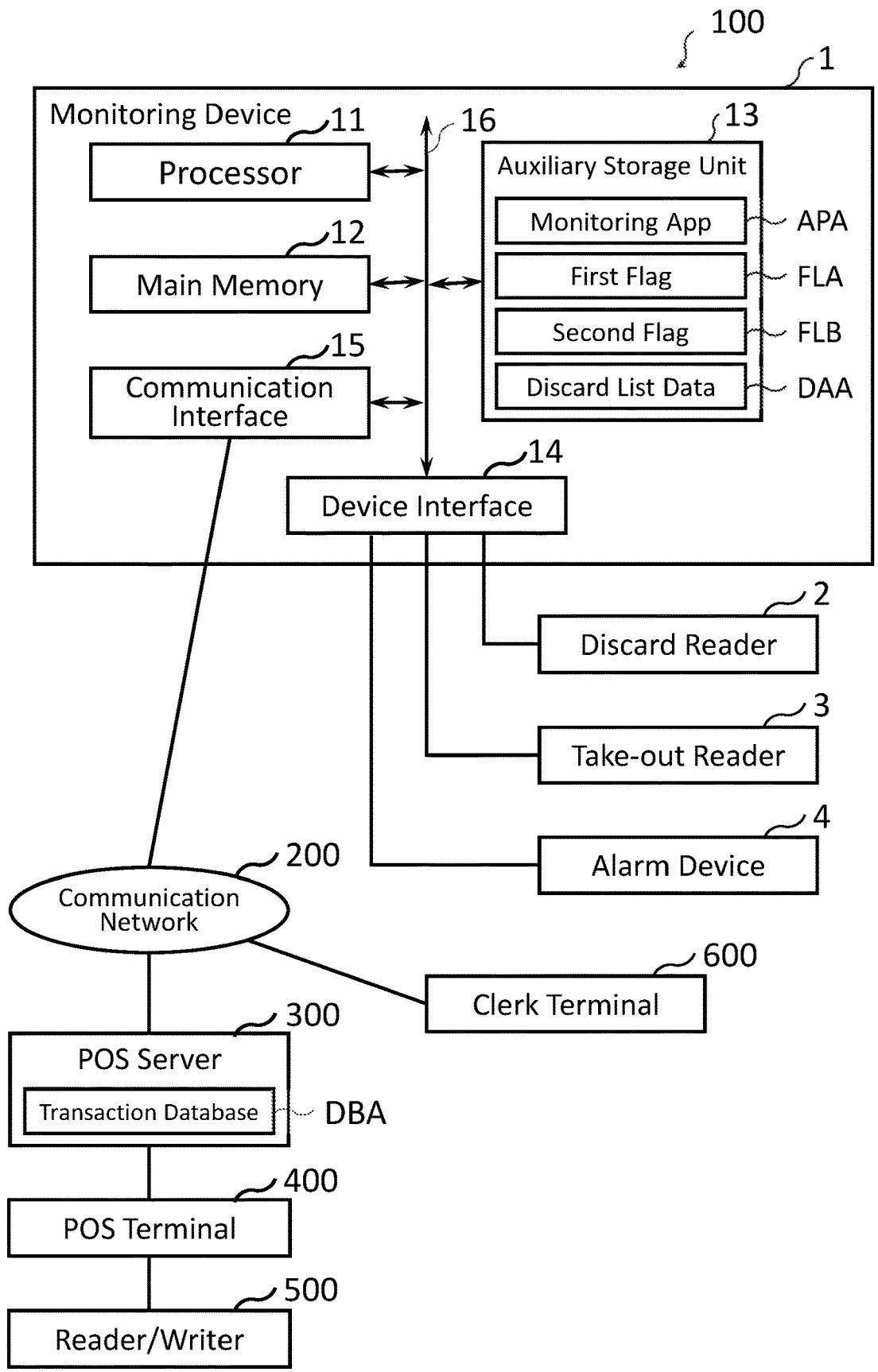
FIG. 1 is a block diagram showing a monitoring system including a monitoring device according to an embodiment.

Hereinafter, certain example embodiments will be described with reference to the drawings. A monitoring device in an embodiment is adapted to a retail store in which a POS (point-of-sale) system has been introduced. The retail store of this example also has a food and drink consumption area (also referred to as a "food and drink area" for simplicity). FIG. 1 is a block diagram of a monitoring system 100 including a monitoring device 1 according to an embodiment.

The monitoring system 100 further includes a discard reader 2, a take-out reader 3, and an alarm device 4. In an embodiment, two or more discard readers 2, the take-out readers 3, and alarm devices 4 may be connected to the monitoring device 1. The monitoring device 1 can communicate with a POS server 300 and a clerk terminal 600 via a communication network 200.

For example, the communication network 200 is a LAN (Local Area Network). In an embodiment, the Internet, a VPN (Virtual Private Network), a LAN, a public communication network, a mobile communication network, or the like may be used alone or in appropriate combination.

A POS terminal 400 is connected to the POS server 300. A reader/writer 500 is connected to the POS terminal 400. The POS server 300, the POS terminal 400, and the reader/writer 500 make up a POS system. The POS server 300 manages transaction data related to transactions processed by the POS terminal 400 in a transaction database DBA. The POS terminal 400 processes a transaction by performing registration of a commodity to be purchased by a customer in the transaction, settlement (receiving payment) of a price of the transaction, or the like. The reader/writer 500 reads tag data from a wireless tag attached to the commodity being purchased. The reader/writer 500 writes tax type data to the wireless tag under the control of the POS terminal 400. In this case, the tax type data indicates the tax rate and/or tax treatment to be associated with purchases of the commodity.

The clerk terminal 600 is a terminal device used by a clerk who deals with a report issued by the monitoring device 1. As the clerk terminal 600, an information communication terminal that can be carried by a clerk, such as a smartphone or a tablet computer, is suitable. However, any type of computer may be used as the clerk terminal 600. The clerk is a security guard, a store clerk, or the like.

The monitoring device 1 monitors in-store consumptions of commodities settled at a price reflecting the application of a reduced tax rate. The discard reader 2 and the take-out reader 3 read tag data stored in a wireless tag. The discard reader 2 is installed so as to read tag data from a wireless tag attached to a commodity that has been thrown in a trash can in a food and drink consumption area of the store, for example. The take-out reader 3 is installed so as to read tag data from a wireless tag passing through an exit of the food and drink consumption area. For example, the entrance and the exit of the food and drink area consumption are separated from each, the respective passing directions through entrance and exit are limited to one direction each, and the take-out reader 3 is installed near the exit.

The alarm device 4 executes an alarm operation for a customer who has passed through the exit of the food and drink area. As the alarm device 4, various devices capable of outputting human-perceptible signals, such as a display device, a speaker device, and a vibration device, may be used alone or in appropriate combination. A plurality of devices of the same type may be used in combination as the alarm device 4. For example, a liquid crystal display device and a patrol lamp (warning light) may be provided as the alarm device 4. Further, for example, a buzzer and a speaker device may be provided as the alarm device 4.

The take-out reader 3 is installed at the exit of the food and drink area. The alarm device 4 is typically also installed at the exit of the food and drink area. For example, the take-out reader 3 and the alarm device can be housed in the same housing installed at the exit of the food and drink area. The monitoring device 1 may be housed in the housing, or may be installed in another housing and connected to the take-out reader 3 and the alarm device 4 via a communication cable.

The monitoring device 1 includes a processor 11, a main memory 12, an auxiliary storage unit 13, a device interface 14, a communication interface 15, and a transmission path 16. The processor 11, the main memory 12, the auxiliary storage unit 13, the device interface 14, and the communication interface 15 can communicate with each other via the transmission path 16. The processor 11, the main memory 12, and the auxiliary storage unit 13 are connected to each other via the transmission path 16, thereby making up a controller for controlling the monitoring device 1.

The processor 11 executes information process for performing various functions of the monitoring device 1 in accordance with one or more information process programs such as an operating system and one or more application programs. The processor 11 is, for example, a CPU (central processing unit).

The main memory 12 includes a nonvolatile memory area and a volatile memory area. The nonvolatile memory area stores the information process program(s). Either or both of the nonvolatile and volatile memory areas may store data necessary for the processor 11 to execute information process. The volatile memory area is used by the processor as a work area for temporarily storing the data and programs. The nonvolatile memory area is, for example, a ROM (read only memory). The volatile memory area is, for example, a RAM (random access memory).

The auxiliary storage unit 13 is, for example, an EEPROM (electric erasable programmable read-only memory), an HDD (hard disc drive), or an SSD (solid state drive). The auxiliary storage unit 13 stores data and programs used by the processor 11 to perform various types of process, data generated by processing by the processor 11, or the like. The auxiliary storage unit 13 may store the above-described information process programs.

The discard reader 2, the take-out reader 3, and the alarm device 4 are connected to the device interface 14 via communication cables. The device interface 14 is an interface circuit configured to execute communication process for exchanging data with each of the discard reader 2, the take-out reader 3, and the alarm device 4 under the control of the processor 11. As the device interface 14, for example, a well-known device conforming to a USB (universal serial bus) standard can be used. As the device interface 14, a well-known device conforming to the wireless LAN standard may be used to exchange data with each of the discard reader 2, the take-out reader 3, and the alarm device 4 by wireless communication. The device interface 14 may include a plurality of types of devices.

The communication interface 15 is a network interface circuit configured to perform communication processing for data communication via the communication network 200. As the communication interface 15, for example, a well-known communication device conforming to a well-known wired LAN standard or wireless LAN standard can be applied. The transmission path 16 includes an address bus, a data bus, a control signal line, and the like, through which data and control signals are exchanged between the connected units.

The auxiliary storage unit 13 stores a monitor application APA, which is one of the information process programs executed by the processor 11. The monitor application APA is an application program to perform the monitoring process to be described later. A part of the storage area of the auxiliary storage unit 13 is used as an area for storing a first flag FLA, a second flag FLB, and discard list data DAA. The first flag FLA indicates that an alarm by a first method is enabled when the first flag FLA is enabled. The second flag FLB indicates that an alarm by a second method is enabled when the second flag FLB is enabled. The discard list data DAA is data representing a list of identifiers of disposed wireless tags.

As the monitoring device 1, for example, a general-purpose computer device can be used. In general, the monitoring device 1 is transferred in a state in which the monitor application APA is stored in the auxiliary storage unit 13 and the first flag FLA, the second flag FLB, and the discard list data DAA are not stored. However, the monitor application APA may be transferred separately from hardware in a state in which the monitor application APA is not stored in the auxiliary storage unit 13 or in a state in which a different version of the same type of application program is stored in the auxiliary storage unit 13. Then, the monitor application APA may be installed in the auxiliary storage unit 13 in response to an operation by an administrator to setup the monitoring device 1. The monitor application APA can be installed from a removable recording medium such as a magnetic disk, a magneto-optical disk, an optical disk, or a semiconductor memory, or downloaded via a network. The first flag FLA, the second flag FLB, and the discard list data DAA are generated and stored in the auxiliary storage unit 13 by the processor 11 executing information process based on the monitor application APA.

Next, the operation of the monitoring system 100 configured as described above will be described. The contents of the various processes described below are merely examples, and it is possible that the order of some processes may be changed, some of the processes may be omitted, or other processes may be added as appropriate. For example, in the following description, some steps are not described in order to focus on the explanation of the characteristic operations. For example, when an error occurs, a process for coping with the error may be performed. However, the descriptions of such a process is omitted.

In a store where the monitoring system 100 is used, a wireless tag is attached to each of the commodities sold and to be purchased in the store. Each wireless tag wirelessly transmits stored tag data. The tag data includes an identifier for identifying the wireless tag in the monitoring system 100.

When a customer registers a commodity to be purchased, the tag data of the wireless tag attached to the commodity is read by the reader/writer 500 and sent to the POS terminal 400. The POS terminal 400 generates a list of commodities to be purchased in one transaction based on the tag data sequentially transmitted from the reader/writer 500. When the POS terminal 400 completes the generation of the list of all the commodities to be purchased in the transaction, the POS terminal 100 determines the total sales amount of the purchased commodities shown in the list and settles the total amount. The POS terminal 400 applies either a reduced tax rate or a standard tax rate in accordance with an instruction from an operator of the POS terminal 100, which is made based on the declaration of the customer. When the settlement is completed, the POS terminal 400 transmits transaction data related to the transaction to the POS server 300. The transaction data transmitted by the POS terminal 400 includes at least the identifiers included in all the tag data transmitted from the reader/writer 500. The transaction data of the POS terminal 400 further includes various types of information about the transaction, such as an SKU (Stock Keeping Unit) code for identifying an SKU of the purchased commodity, a quantity of each SKU, a unit price, a payment amount, and a payment method. In addition, the POS terminal 400 controls the reader/writer 500 to write data indicating that the reduced tax rate is applied (hereinafter, referred to as reduced tax data) to the wireless tag attached to the commodity to which the reduced tax rate is applied. For example, the POS terminal 400 adds predetermined data to the tag data already stored in the wireless tag. The POS terminal 400 may change a flag included in the tag data already stored in the wireless tag to indicate that the reduced tax rate is applied. In such a case, the flag corresponds to the reduced tax data.

When the POS server 300 receives the transaction data from the POS terminal 400, the POS server 300 updates the transaction database DBA to include the transaction data. The POS server 300 may update the transaction database DBA to include the transaction data after editing processes so as to omit a part of the data included in the received transaction data or add data. However, the POS server 300 updates the transaction database DBA for each transaction so that all the identifiers of the wireless tags attached to the purchased commodities in the transaction can be determined.

In the monitoring device 1, the processor 11 writes the first flag FLA and the second flag FLB in the auxiliary storage unit 13, for example, as a part of the installation process of the monitor application APA or as an initial setting process of the monitoring device 1. Here, the processor 11 may set the first flag FLA and the second flag FLB to a predetermined initial state or a state designated by the administrator of the monitoring system 100.

Figure 2:
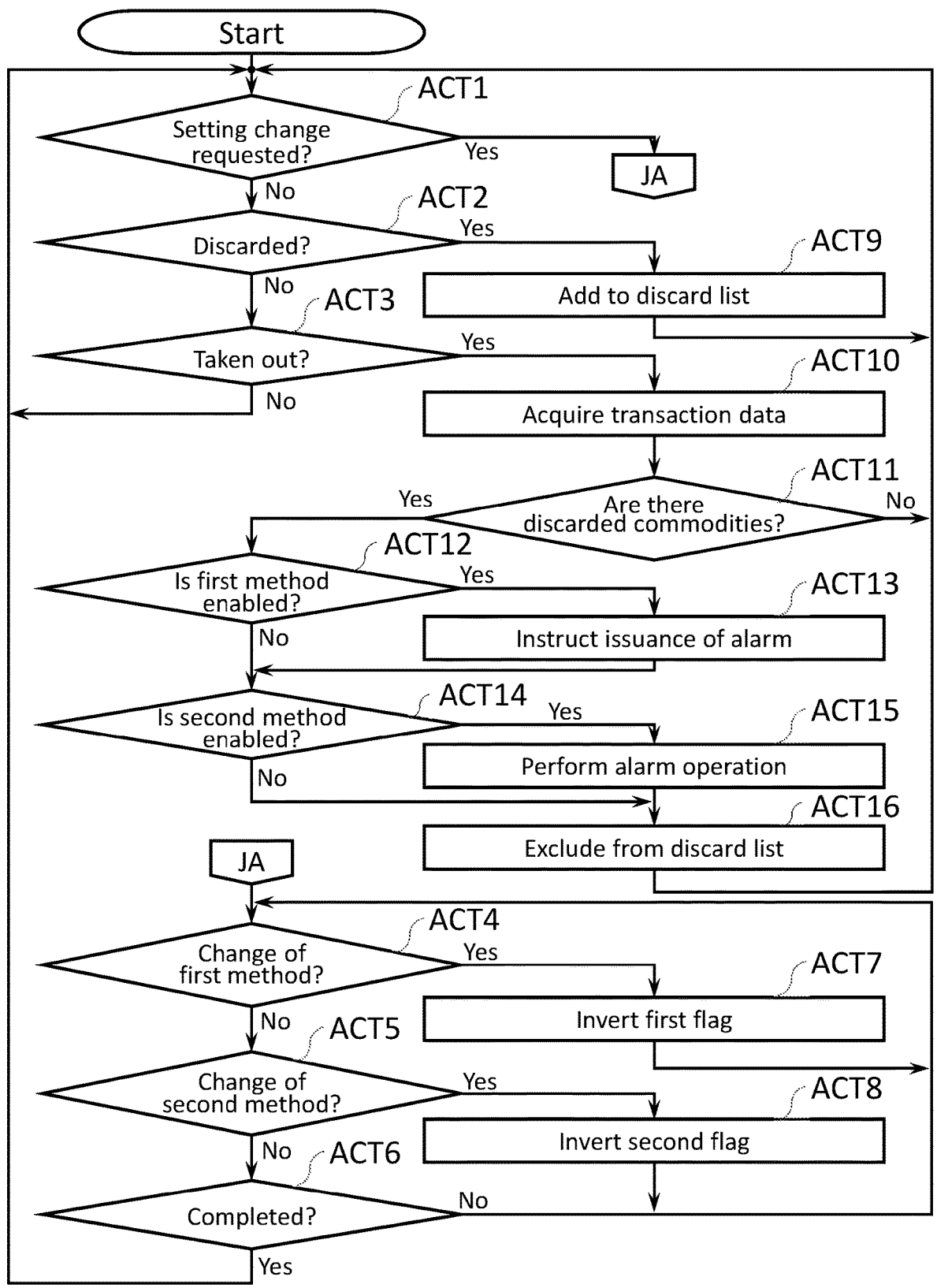
FIG. 2 is a flowchart of a monitoring process.

When the monitoring device 1 is activated, the processor 11 starts information process based on the monitor application APA (hereinafter, referred to as monitoring process). FIG. 2 is a flowchart of the monitoring process.

In ACT1, the processor 11 checks whether a change in setting is requested. If the processor 11 cannot confirm a request, the processor 11 determines NO and proceeds to ACT2. In ACT2, the processor 11 checks whether a commodity has been discarded. If such an event cannot be confirmed, the processor 11 determines NO and proceeds to ACT3. In ACT3, the processor 11 checks whether a commodity has been taken out. If such an event cannot be confirmed, the processor 11 determines NO and returns to ACT1. Thus, in ACT1 to ACT3, the processor 11 waits for a change request or the aforementioned events.

When an administrator of the monitoring device 1 such as a clerk of the store wants to change a method of an alarm by the monitoring device 1, he or she accesses the monitoring device 1 via the communication network 200 by using the clerk terminal 600 or any other information communication terminal, and requests a change of setting. The clerk terminal 600 performs a function of a user interface for the clerk to change the setting related to the alarm.

When the change of the setting is requested as described above, the processor 11 determines YES in ACT1 and proceeds to ACT4. In ACT4, the processor 11 checks whether a change of the first method is requested. If the processor 11 cannot confirm the request, the processor 11 determines NO and proceeds to ACT5. In ACT5, the processor 11 checks whether a change of the second method is requested. If the processor 11 cannot confirm the request, the processor 11 determines NO and proceeds to ACT6. In ACT6, the processor 11 checks whether the setting is completed. If the processor 11 cannot confirm the completion, the processor 11 determines NO and returns to ACT4. Thus, in ACT4 to ACT6, the processor 11 waits for the request of the setting change or completion of the setting.

When the clerk wants to change whether to enable the first method, he or she operates the clerk terminal 600 or another terminal to request for the change of the first method. Similarly, when the clerk wants to change whether to enable the second method, he or she operates the clerk terminal 600 or another terminal to request for the change of the second method. In the first method, the clerk terminal 600 performs an alarm operation for the purpose of notifying the clerk. In the second method, the alarm device 4 performs an alarm operation for the purpose of notifying the customer. Then, when the clerk finishes setting the alarm to a desired state, the clerk operates the terminal to complete the setting.

When the change of the first method is requested, the processor 11 determines YES in ACT4 and proceeds to ACT7. As ACT7, the processor 11 inverts the first flag FLA. That is, the processor 11 disables the first flag FLA when the first flag FLA is enabled, and enables the first flag FLA when the first flag FLA is disabled. Thereafter, the processor 11 returns to the standby state of ACT4 to ACT6.

When the change of the second method is requested, the processor 11 determines YES in ACT5 and proceeds to ACT8. In ACT8, the processor 11 inverts the second flag FLB. That is, the processor 11 disables the second flag FLB if the second flag FLB is enabled, and enables the second flag FLB if the second flag FLB is disabled. Thereafter, the processor 11 returns to the standby state of ACT4 to ACT6.

When the setting is completed, the processor 11 determines YES in ACT6 and returns to the standby state in ACT1 to ACT3.

A customer can bring a settled commodity into the food and drink area and then consume the commodity. When the customer discards the commodity (together with the wireless tag attached thereto) into a trash can or the like, the wireless tag enters the read area of the discard reader 2. In response to this, the discard reader 2 reads tag data from the now discarded wireless tag and transmits it to the monitoring device 1. Then, the tag data is received by the monitoring device 1 via the device interface 14. In such a case, if the processor 11 confirms that the tag data captured by the device interface 14 includes the reduced tax data, it determines that a discarding has occurred (YES in ACT2), and proceeds to ACT9. That is, the processor 11 determines that a discarding has occurred when a wireless tag attached to a commodity for which a settlement was previously completed utilizing the reduced tax rate has now been detected as discarded.

The processor 11 acquires the identifier included in the tag data read by the discard reader 2 as the identifier of the tag discarded in the food and drink area or some other predetermined monitoring area according to the monitor application APA. In addition, when the processor 11 determines YES in ACT2, it is also determined that the acquired identifier is a tag attached to a commodity for which payment was made at the reduced tax rate. In an embodiment, this determination can be made in accordance with the fact that the reduced tax data indicating that the reduced tax rate has been applied is recorded in the tag.

In ACT9, the processor 11 adds the identifier of the discarded wireless tag to the discard list. For example, the processor 11 updates the discard list data DAA to include the identifier included in the tag data captured by the device interface 14. If the discard list data DAA is not stored in the auxiliary storage unit 13, the processor 11 generates new discard list data DAA representing a discard list including only the identifier of the tag data captured by the device interface 14, and writes the discard list data DAA in the auxiliary storage unit 13. Thereafter, the processor 11 returns to the standby state of ACT1 to ACT3.

When a customer brings a commodity into the drink and eat space and then takes the commodity out of the drink and eat space, the take-out reader 3 reads tag data from the wireless tag attached to the commodity and transmits the tag data to the monitoring device 1. Then, the tag data is received by the monitoring device 1 via the device interface 14. In response to this, the processor 11 determines that taking-out has occurred (YES in ACT3), and proceeds to ACT10. When the processor determines YES in ACT3, the identifier included in the tag data captured by the monitoring device 1 through the interface 14 is acquired as the identifier of the tag taken out from the food and drink area or the predetermined monitoring area according to the monitor application APA.

In ACT10, the processor 11 acquires transaction information related to a transaction in which the taken out commodity is included as a target purchased commodity. For example, the processor 11 controls the communication interface 16 to transmit request data including the identifier of the tag data captured by the device interface 14 to the POS server 300 via the communication network 200.

When the request data is transmitted to the POS server 300 through the communication network 200, the POS server 300 reads the transaction data including the identifier included in the request data from the transaction database DBA, and transmits response data including the transaction data to the monitoring device 1 through the communication network 200. The POS server 300 may include the transaction data read from the transaction database DBA in the response data as it is, or may include, in the response data, transaction data after editing so as to omit a part of data included in the transaction data or add some predetermined data. However, the POS server 300 can include all the identifiers of the wireless tags included in the transaction data read from the transaction database DBA in principle. However, the identifier included in the request data may not be included in the response data.

When the response data is transmitted to the monitoring device 1 through the communication network 200, the response data is received by the monitoring device 1 through the communication interface 15. Then, the processor 11 stores the transaction data included in the response data in the main memory 12 or the auxiliary storage unit 13.

In ACT11, the processor 11 confirms whether there is a purchased commodity for which the wireless tag is discarded in the same transaction as the taken-out commodity. For example, the processor 11 checks whether any of the identifiers included in the transaction data acquired in ACT10 matches the identifier included in the discard list indicated by the discard list data DAA. Then, if they match, the processor 11 determines YES and proceeds to ACT12.

In ACT12, the processor 11 checks whether the first method is enabled. For example, if the first flag FLA is enabled, the processor 11 determines YES and proceeds to ACT13. In ACT13, the processor 11 instructs the clerk terminal 600 to issue a notification. For example, the processor 11 controls the communication interface 15 to transmit predetermined instruction data for instructing issuance of the alarm to the clerk terminal 600.

When the instruction data is transmitted to the clerk terminal 600 through the communication network 200, the clerk terminal 600 executes the predetermined alarm operation. The alarm operation may be any operation such as display of a predetermined screen on a display device or output of an alarm sound or an alarm message. By this alarm operation, the clerk recognizes that the customer who may have consumed the commodity settled with the reduced tax rate in the food and drink area has left the food and drink area.

As described above, the processor 11 executes the control process for operating the clerk terminal 600 to execute the alarm operation for the clerk according to the monitor application APA.

After the processor 11 instructs the issuance of the alarm in ACT13, the process proceeds to ACT14. If the first flag FLA is disabled, the processor 11 determines NO in ACT12, passes ACT13, and proceeds to ACT14. In ACT14, the processor 11 checks whether the second method is enabled. For example, if the second flag FLB is enabled, the processor 11 determines YES and proceeds to ACT15. In ACT15, the processor 11 operates the alarm device 4 to perform an alarm operation. For example, the processor 11 generates predetermined instruction data for instructing the alarm device 4 to be activated through the device interface 14.

Upon receiving the command data, the alarm device 4 executes a predetermined alarm operation. The alarm operation may be any operation such as display of a predetermined screen on a display device or output of an alarm sound or an alarm message. By this alarm operation, the customer recognizes that the commodity settled with the reduced tax rate has been consumed in the food and drink area.

As described above, the processor 11 executes the alarm process for operating the alarm device 4 to perform the predetermined alarm operation according to the monitor application APA.

When a predetermined termination condition is satisfied, the processor 11 stops the alarm operation in the alarm device 4. The termination condition(s) may be arbitrarily set or selected. For example, the processor can determine that the termination condition is satisfied when the elapsed time from the start of the alarm operation reaches a predetermined time. Alternatively, for example, the processor 11 can determine that the termination condition is satisfied, when a predetermined operation is performed by the customer or the clerk using an operation device. In the present context, an operation device may be any operation device such as the clerk terminal 600 or another operation device separately provided in the vicinity of the alarm device 4 for canceling the alarm by user operations.

After causing the processor 11 to perform the alarm operation in ACT15, the process proceeds to ACT16. If the second flag FLB is disabled, the processor 11 determines NO in ACT14, passes ACT15, and proceeds to ACT16. In ACT16, the processor 11 excludes the identifier included in the transaction acquired in ACT10 from the discard list. For example, the processor 11 updates the discard list data DAA so that the discard list does not include the identifier included in the transaction date acquired in ACT10. Thereafter, the processor 11 returns to the standby state of ACT1 to ACT3.

If none of the identifiers included in the transaction date acquired in ACT10 match any of the identifiers included in the discard list indicated by the discard list data DAA, the processor 11 determines NO in ACT11 on the basis that there is no purchased commodity for which the wireless tag has been discarded in the same transaction, and returns to the standby state in ACT1 to ACT3. That is, the processor 11 causes neither the clerk terminal 600 nor the alarm device 4 to perform the alarm operation.

In some instances, the customer can consume some portion a packaged commodity or commodities in the food and drink area, discard the packaging in the trash can, and bring back the still remaining portion of the previously packaged commodity or commodities. Such an action is one of possible actions of customers who use the food and drink area. However, if the consumed commodity (or portion thereof) is a commodity to which the reduced tax rate is applied, the behavior of the customer may not be appropriate.

According to the operations of the monitoring device 1, either or both of the clerk terminal 600 and the alarm device 4 performs an alarm operation in response to the customer's inappropriate exit from the food and drink area with regard to packaged commodities (hereinafter, referred to as an inappropriate action). The clerk recognizes such an inappropriate action by the alarm operation at the clerk terminal 600 and can deal with the customer's action. How the clerk deals with the action depends on the store's policy. For example, the clerk pays attention to the customer who has performed the inappropriate action to prevent the customer from repeating the inappropriate action in the future. Alternatively, the clerk may, for example, request the customer to pay the difference between the reduced and regular tax amounts. Further, the customer recognizes that he or she committed the inappropriate action by the alarm operation of the alarm device 4, and can cope with his or her own inappropriate action. How the customer should deal with the inappropriate action depends on his or her decision. For example, the customer will be careful not to commit such an inappropriate action. Alternatively, the customer may, for example, make an offer to pay the difference between the reduced and regular tax amounts.

In this way, a customer who has received an alarm about his or her inappropriate action is expected to pay attention so as not to repeat such an inappropriate action thereafter, and it is possible to suppress in-store consumption of a commodity settled at the reduced tax rate.

In one embodiment, the alarm operation can also be performed by comparing an identifier list of all of the wireless tags attached to commodities taken out from the food and drink area by a customer with an identifier list of wireless tags shown in the transaction data, and outputting an alarm in response to the absence in the first identifier list of any identifier of the wireless tag attached to the commodity to which the reduced tax rate is applied. In such a case, however, the tag data must be read from all the wireless tags attached to all the commodities carried by the customer. In the case where a wireless tag is attached to all inexpensive commodities such as foods, the wireless tag is required to be inexpensive, and there is a possibility that the communication distance and response speed of the wireless tag will be low. In a case where the customer brings a large number of such wireless tags at the same time, there is no guarantee that tag data can be read from all the wireless tags within a short time as the customer passes through the exit of the food and drink area. However, according to the monitoring device 1, it is sufficient for the take-out reader 3 to read tag data from at least one wireless tag attached to a commodity in one transaction. Therefore, the wireless tag having low performance can be used to prevent the customer's inappropriate action in the monitoring system 100.

Further, according to the monitoring device 1, the validity/invalidity of each of the alarm operation in the clerk terminal 600 and the alarm operation in the alarm device 4 can be set individually. For this reason, it is possible to perform flexible operation adapted to a difference in response policy for each store with respect to the customer's inappropriate action. For example, in a store having a policy strictly corresponding to an inappropriate action, both the alarm operation in the clerk terminal 600 and the alarm operation in the alarm device 4 may be enabled. In addition, for example, in a store having a policy of flexibly coping with an inappropriate action according to the determination of the clerk, only the alarm operation in the clerk terminal 600 may be enabled. Further, for example, in a store without any clerk, only the alarm operation by the alarm device 4 may be enabled.

The aforementioned embodiments can be variously modified as follows. The monitoring process may be executed by a processor included in the POS server 300, the POS terminal 400, or the clerk terminal 600. That is, the POS server 300, the POS terminal 400, or the clerk terminal 600 may also have the function as the monitoring device 1.

In the determination in ACT2, the processor 11 may determine that the commodity to which the wireless tag identified by the identifier read by the discard reader 2 is attached is a commodity that has been settled with the reduced tax rate based on transaction data. In such a case, writing of the reduced tax data to the wireless tag can be omitted.

The function of the alarm operation in the terminal 600 or in the alarm device 4 may not be provided. Alternatively, another alarm operation such as an alarm operation in the POS terminal 400 may be performed. In such a case, the function for the alarm operation in the clerk terminal 600 and the function for the alarm operation in the alarm device 4 may not be provided at all.

The discard reader 2 may not be provided in or near the trash can as long as tag data can be read from a wireless tag located in a place where a commodity is discarded or thrown away.

The discard reader 2, the take-out reader 3, and the alarm device 4 may communicate with the monitoring device 1 via the communication network 200 or another communication network.

When the passing direction of the customer at the exit of the food and drink area cannot be restricted, a detection device for detecting the moving direction of the customer may be separately provided, and the tag data read by the take-out reader may be validated when the detection device detects that the customer moves in the direction of leaving the food and drink area.

The monitoring area can be changed as appropriate, for example, within a store. The monitoring area may also be an area outside the store. For example, a food and drink space in a food court may be the monitor area.

The tag data may be read from the tag by any method. An operation device and a display device may be incorporated in or externally attached to the monitoring device 1, and the operation device and the display device may be used as a user interface for changing settings.

Some or all of the functions performed by the processor 11 through the information process may be performed by hardware that executes information process such as a logic circuit. Each of the above-described functions can be implemented by combining hardware such as the above-described logic circuit with software.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A monitoring device, comprising:
a first interface circuit connectable to first and second readers, wherein the first reader is configured to read tag data from a wireless tag attached to a commodity discarded within a predetermined area, and the second reader is configured to read tag data from a wireless tag attached to a commodity being taken out from the predetermined area; and
a processor configured to:
upon receipt of first tag data from the first reader via the first interface circuit, determine whether a predetermined tax rate was applied to a commodity to which a wireless tag having the first tag data is attached when the commodity was checked out, and upon determining that the predetermined tax rate was applied when the commodity was checked out, store a tag identifier of the wireless tag in a memory, and
upon receipt of second tag data from the second reader via the second interface circuit,
determine a transaction in which a commodity to which a wireless tag having the second tag data is attached has been checked out,
determine whether a tad identifier of a wireless tad attached to another commodity checked out in the determined transaction is stored in the memory, and
upon determining that the tag identifier is stored in the memory, issue a signal to output an alarm.

2. The monitoring device according to claim 1, wherein the processor determines that the predetermined tax rate was applied when predetermined data is included in the first tag data.

3. The monitoring device according to claim 1, wherein the first interface circuit is further connectable to an alarm device, and
the processor is further configured to control the first interface circuit to output the signal to the alarm device to output the alarm.

4. The monitoring device according to claim 3, further comprising:
a memory that stores a first flag, wherein
the signal is output to the alarm device when the first flag is enabled.

5. The monitoring device according to claim 4, wherein the processor is further configured to, upon receipt of an input, disable the first flag stored in the memory.

6. The monitoring device according to claim 3, wherein the alarm device shares a housing with the second reader.

7. The monitoring device according to claim 1, further comprising:
a second interface circuit configured to communicate with a terminal, wherein
the processor is further configured to control the second interface circuit to transmit the signal to the terminal to output the alarm.

8. The monitoring device according to claim 7, further comprising:
a memory that stores a second flag, wherein
the signal is transmitted to the terminal when the second flag is enabled.

9. The monitoring device according to claim 7, wherein the processor is further configured to, upon receipt of an input, disable the second flag stored in the memory.

10. The monitoring device according to claim 1, wherein the predetermined tax rate is a reduced tax rate applied to a commodity when the commodity is not consumed within the predetermined area.

11. A monitoring method, comprising:
receiving first tag data from a first reader, which is configured to read tag data from a wireless tag attached to a commodity discarded within a predetermined area, and determining whether a predetermined tax rate was applied to a commodity to which a wireless tag having the first tag data is attached when the commodity was checked out;
upon determining that the predetermined tax rate was applied when the commodity was checked out, storing a tag identifier of the wireless tag in a memory;
receiving second tag data from a second reader, which is configured to read tag data from a wireless tag attached to a commodity being taken out from the predetermined area, determining a transaction in which a commodity to which a wireless tag having the second tag data is attached has been checked out, and determining whether a tag identifier of a wireless tag attached to another commodity checked out in the determined transaction is stored in the memory; and
upon determining that the tag identifier of the wireless tag having the second tag data is stored in the memory, issuing a signal to output an alarm.

12. The monitoring method according to claim 11, wherein the predetermined tax rate is determined to have been applied when predetermined data is included in the first tag data.

13. The monitoring method according to claim 11, further comprising:
outputting the signal to an alarm device to output the alarm.

14. The monitoring method according to claim 13, further comprising:
storing a first flag in the memory, wherein
the signal is output to the alarm device when the first flag is enabled.

15. The monitoring method according to claim 14, further comprising:
upon receipt of an input, disabling the first flag stored in the memory.

16. The monitoring method according to claim 13, wherein the alarm device shares a housing with the second reader.

17. The monitoring method according to claim 11, further comprising:
transmitting the signal to a terminal to output the alarm.

18. The monitoring method according to claim 17, further comprising:
storing a second flag in the memory, wherein
the signal is transmitted to the terminal when the second flag is enabled.

19. The monitoring method according to claim 11, wherein the predetermined tax rate is a reduced tax rate applied to a commodity when the commodity is not consumed within the predetermined area.

20. A monitoring system, comprising:
a first reader configured to read tag data from a wireless tag attached to a commodity discarded within a predetermined area;

a second reader configured to read tag data from a wireless tag attached to a commodity being taken out from the predetermined area; and a monitoring device configured to:
  upon receipt of first tag data from the first reader, determine whether a predetermined tax rate was applied to a commodity to which a wireless tag having the first tag data is attached when the commodity was checked out, and upon determining that the predetermined tax rate was applied when the commodity was checked out, store a tag identifier of the wireless tag in a memory, and
  upon receipt of second tag data from the second reader, determine of a transaction in which a commodity to which a wireless tag having the second tag data is attached has been checked out,
    determine whether a taq identifier of a wireless taq attached to another commodity checked out in the determined transaction is stored in the memory, and
    upon determining that the tag identifier is stored in the memory, issue a signal to output an alarm.

* * * * *

UNITED STATES PATENT AND TRADEMARK OFFICE
CERTIFICATE OF CORRECTION

| | |
|---|---|
| PATENT NO. | : 11,321,695 B2 |
| APPLICATION NO. | : 17/175712 |
| DATED | : May 3, 2022 |
| INVENTOR(S) | : Suguru Kato |

It is certified that error appears in the above-identified patent and that said Letters Patent is hereby corrected as shown below:

In the Claims

In Column 11, Claim 1, Line 30, please delete "tad" and replace with "tag" (2 instances).

In Column 13, Claim 20, Line 17, please delete "taq" and replace with "tag" (2 instances).

Signed and Sealed this
Twentieth Day of December, 2022

Katherine Kelly Vidal
*Director of the United States Patent and Trademark Office*